United States Patent
Zhou (10) Patent No.: US 11,300,522 B2
(45) Date of Patent: Apr. 12, 2022

(54) ARTICLE DAMAGE EVALUATION

(71) Applicant: Advanced New Technologies Co., Ltd., George Town (KY)

(72) Inventor: Fan Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,598

(22) Filed: May 29, 2020

(65) Prior Publication Data

US 2020/0292464 A1    Sep. 17, 2020

Related U.S. Application Data (63) Continuation of application No. PCT/CN2018/117861, filed on Nov. 28, 2018.

(30) Foreign Application Priority Data

Mar. 16, 2018   (CN) .......................... 201810220310.2

(51) Int. Cl.
*G01N 21/88* (2006.01)
*G06T 7/00* (2017.01)
*G06N 3/04* (2006.01)

(52) U.S. Cl.
CPC ........... *G01N 21/8851* (2013.01); *G06N 3/04* (2013.01); *G01N 2021/8887* (2013.01)

(58) Field of Classification Search
USPC ........................................ 382/141, 149, 155
See application file for complete search history.

(56) References Cited

U.S. PATENT DOCUMENTS 6,495,833 B1    12/2002  Alfano et al.
9,129,355 B1 *  9/2015   Harvey ................... G06K 9/52
                          (Continued)

FOREIGN PATENT DOCUMENTS

CN    101995395    3/2011
CN    103310223    9/2013
(Continued)

OTHER PUBLICATIONS

Wang et al. Non-destructive testing and evaluation of composite materials/structure: A state-of-the-art review, 2020 Advance in Mechanical Engineering DOI: 10.1177/1687814020913761, pp. 1-55. (Year: 2020).*
(Continued)

*Primary Examiner* — Ishrat I Sherali
(74) *Attorney, Agent, or Firm* — Fish & Richardson P.C.

(57) ABSTRACT

Implementations of the present specification provide article damage evaluation methods and apparatuses. In one aspect, the method includes: determining, by a terminal device, that a photographing device is in an active state; responsive to determining that the photographing device is in the active state, identifying, from a field of view of the photographing device, a particular surface region of the article that encompasses the damage to the article; obtaining an image of the particular surface region using the photographing device; determining surface structure information and surface material information of the surface region of the article using one or more infrared emitters and one or more infrared receivers; and generating, from the image, the surface structure information, and the surface material information, and based on a predetermined damage evaluation model, an output specifying a degree of the damage to the article.

15 Claims, 5 Drawing Sheets

(56) References Cited

U.S. PATENT DOCUMENTS

| | | | | |
|---|---|---|---|---|
| 10,145,684 | B1* | 12/2018 | Tofte | G06Q 40/08 |
| 10,354,386 | B1* | 7/2019 | Farnsworth | G06T 7/0085 |
| 10,692,050 | B2* | 6/2020 | Taliwal | G06K 9/4671 |
| 10,937,141 | B2* | 3/2021 | Song | G06K 9/6202 |
| 11,080,839 | B2* | 8/2021 | Xu | G06F 16/55 |
| 11,087,292 | B2* | 8/2021 | Utke | G06K 9/6271 |
| 11,144,889 | B2* | 10/2021 | Li . | G06N 7/005 |
| 2005/0171703 | A1* | 8/2005 | Goldfine | G01N 27/9013 702/30 |
| 2006/0222207 | A1* | 10/2006 | Balzer | G01S 7/4814 382/104 |
| 2009/0265193 | A1* | 10/2009 | Collins | G06Q 30/0185 705/4 |
| 2014/0201022 | A1* | 7/2014 | Balzer | G06T 7/0002 705/26.4 |
| 2015/0332407 | A1* | 11/2015 | Wilson, II | G07C 5/0808 705/4 |
| 2017/0094141 | A1 | 3/2017 | Hicks | |
| 2017/0148102 | A1* | 5/2017 | Franke | G06Q 30/0278 |
| 2017/0293894 | A1 | 10/2017 | Taliwal et al. | |
| 2019/0272630 | A1* | 9/2019 | Inazumi | G01N 21/9515 |
| 2019/0303982 | A1* | 10/2019 | Michel | G05D 1/042 |

FOREIGN PATENT DOCUMENTS

| | | |
|---|---|---|
| CN | 203643383 | 6/2014 |
| CN | 105915853 | 8/2016 |
| CN | 107000118 | 8/2017 |
| CN | 107358596 | 11/2017 |
| CN | 107392218 | 11/2017 |
| CN | 107622448 | 1/2018 |
| CN | 108550080 | 9/2018 |
| WO | WO 2011042606 | 4/2011 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/117861, dated Feb. 27, 2019, 10 pages (with partial English translation).

PCT International Preliminary Report on Patentability in International Application No. PCT/CN2018/117861, dated Sep. 22, 2020, 9 pages (with English translation).

Extended European Search Report in European Application No. 18909705.8, dated Dec. 2, 2020, 12 pages.

Hahne et al., "Depth Imaging by Combining Time-of-Flight and On-Demand Stereo," 5th International Workshop on Modeling Social Media, Sep. 2009, pp. 70-83.

Kuhnert et al., "Fusion of Stereo-Camera and PMD-Camera Data for Real-Time Suited Precise 3D Environment Reconstruction," Oct. 2006, 2006 IEEE/RSJ International Conference on Intelligent Robots and Systems, pp. 4780-4785.

Photonics.com [online], "Spectroscopy for the Masses," Jun. 2017, retrieved on Nov. 24, 2020, retrieved from URL <https://www.photonics.com/Articles/Spectroscopy_for_the_Masses/a61979>, 7 pages.

Wikipedia.org [online], "Infrared spectroscopy—Wikipedia," Feb. 2, 2018, retrieved on Nov. 24, 2020, retrieved from URL <https://en.wikipedia.org/w/index.php?title=Infrared_spectroscopy&01did=823590535>, 9 pages.

Falco, "Invited Article: High resolution digital camera for infrared reflectography," Review Scientific Instruments, Jul. 2009, 80(7):1-9.

* cited by examiner

FIG. 6

ARTICLE DAMAGE EVALUATION

CROSS-REFERENCE TO RELATED APPLICATIONS

This application is a continuation of PCT Application No. PCT/CN2018/117861, filed on Nov. 28, 2018, which claims priority to Chinese Patent Application No. 201810220310.2, filed on Mar. 16, 2018, and each application is hereby incorporated by reference in its entirety.

TECHNICAL FIELD

One or more implementations of the present specification relate to the field of computer technologies, and in particular, to article damage evaluation methods and apparatuses.

BACKGROUND

In the insurance industry, when a user claims for compensation for damage to an article, an insurance company needs to evaluate a degree of damage to the article, so as to determine a list of items that need to be repaired and an amount of compensation. At present, there are mainly two evaluation methods. A first method is that an adjuster from the insurance company or a third-party evaluation institution conducts on-site evaluation of the damaged article. A second method is that the user photographs the damaged article under the guidance of personnel from the insurance company, and transmits photos to the insurance company over a network, and then a damage evaluator conducts remote damage evaluation based on the photos.

SUMMARY

One or more implementations of the present specification provide article damage evaluation methods and apparatuses, so as to automatically evaluate a damage degree of an article.

According to a first aspect, an article damage evaluation method is provided, including the following: detecting, by a mobile terminal, whether a photographing device is in a photographing state; when detecting that the photographing device is in the photographing state, determining a photographing area of the photographing device for an article, where the photographing area covers a damaged part of the article, and acquiring a photographed image corresponding to the photographing area; emitting multiple infrared rays to the photographing area of the article, so as to determine surface structure information and surface material information of the damaged part of the article; inputting the photographed image, the surface structure information, and the surface material information into a predetermined damage evaluation model; and outputting a damage degree of the damaged part of the article.

According to a second aspect, an article damage evaluation apparatus is provided, including the following: a detection unit, configured to detect whether a photographing device is in a photographing state; a determining unit, configured to: when the detection unit detects that the photographing device is in the photographing state, determine a photographing area of the photographing device for an article, where the photographing area covers a damaged part of the article, and acquire a photographed image corresponding to the photographing area; a communications unit, configured to emit multiple infrared rays to the photographing area, determined by the determining unit, of the article, so as to determine surface structure information and surface material information of the damaged part of the article; an inputting unit, configured to input the photographed image, the surface structure information, and the surface material information into a predetermined damage evaluation model; and an outputting unit, configured to output a damage degree of the damaged part of the article.

In the article damage evaluation methods and apparatuses provided in one or more implementations of the present specification, when detecting that a photographing device is in a photographing state, a mobile terminal determines a photographing area of the photographing device for an article, and acquires a photographed image corresponding to the photographing area; emits multiple infrared rays to the photographing area of the article, so as to determine surface structure information and surface material information of the damaged part of the article; inputs the photographed image, the surface structure information, and the surface material information into a predetermined damage evaluation model; and outputs a damage degree of the damaged part of the article. As such, the damage degree of the article can be automatically evaluated.

BRIEF DESCRIPTION OF DRAWINGS

To describe the technical solutions in the implementations of the present specification more clearly, the following briefly describes the accompanying drawings needed for describing the implementations. Clearly, the accompanying drawings in the following description show merely some implementations of the present specification, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Figure 1:
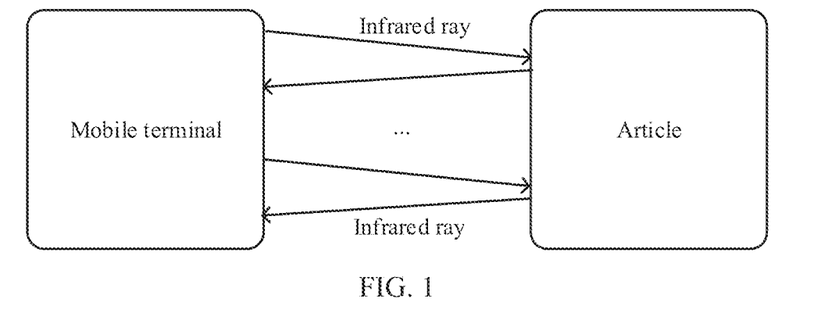
FIG. 1 is a schematic diagram illustrating an application scenario of an article damage evaluation method, according to an implementation of the present specification.

An article damage evaluation method provided in an implementation of the present specification can be applied to a scenario shown in FIG. 1. For example, a mobile terminal in FIG. 1 can be a mobile phone, a tablet computer, etc., and can include a photographing device. In addition, the mobile terminal can further include multiple groups of infrared emitters and multiple groups of receiving sensors. The infrared emitter can emit infrared rays, the receiving sensor can receive infrared rays from the infrared emitter and sense temperatures of the received infrared rays. For example, the article in FIG. 1 can be a bicycle or a car.

It is worthwhile to note that, in FIG. 1, the photographing device of the mobile terminal can operate simultaneously with the infrared emitter and/or the receiving sensor. When photographing the damaged part of the article, the mobile terminal can start multiple groups of infrared emitters to emit multiple infrared rays to the photographing area of the article, so as to determine surface structure information (also referred to as depth information) and surface material information of the damaged part of the article. Then, the mobile terminal can input the photographed image (visual information), the surface structure information, and the surface material information into the predetermined damage evaluation model, so as to output the damage degree of the damaged part of the article. Thus, efficiency of detecting the damage degree of the article can be improved, and accuracy of the detected damage degree can also be improved.

Figure 2:
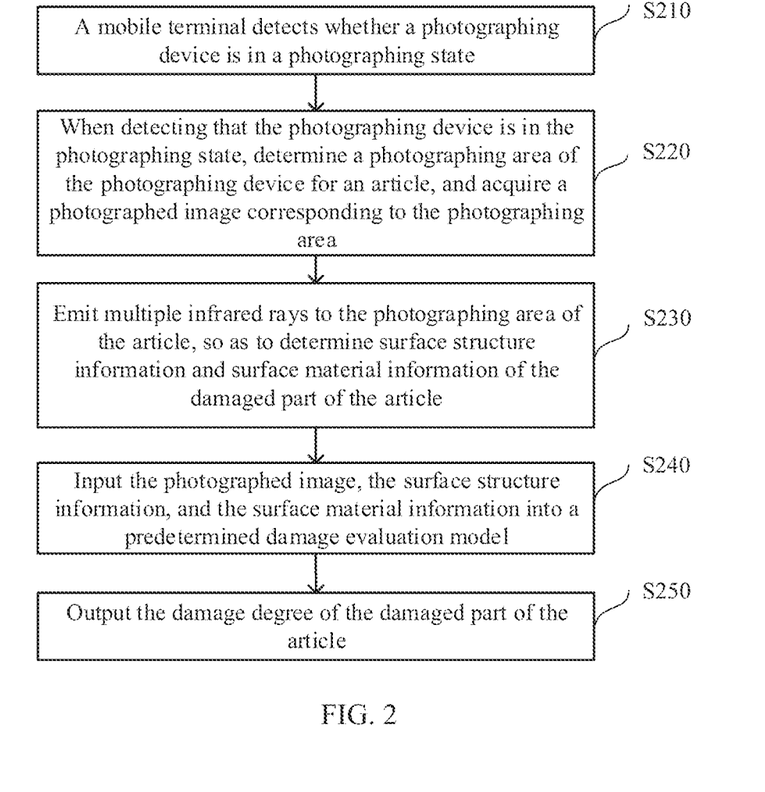
FIG. 2 is a flowchart illustrating an article damage evaluation method, according to an implementation of the present specification.

FIG. 2 is a flowchart illustrating an article damage evaluation method, according to an implementation of the present specification. The method can be performed by the mobile terminal in FIG. 1. As shown in FIG. 2, the method can include the following:

Step S210: A mobile terminal detects whether a photographing device is in a photographing state.

For example, the mobile terminal is a mobile phone, and the photographing device here can be a camera built in the mobile phone.

Step S220: When detecting that the photographing device is in the photographing state, determine a photographing area of the photographing device for an article, and acquire a photographed image corresponding to the photographing area.

In some implementations, the previously described photographing area can be determined based on a field of view as displayed by a viewfinder of the photographing device after successfully focusing the article. It can be understood that, when the user uses the mobile terminal to photograph a damaged part of the article, the previously described field of view can cover the damaged part of the article, so that the determined photographing area can cover the damaged part of the article.

It can be understood that, when the photographing area covers the damaged part of the article, the photographed image corresponding to the photographing area is a photo obtained by photographing the damaged part of the article.

Step S230: Emit multiple infrared rays to the photographing area of the article, so as to determine surface structure information and surface material information of the damaged part of the article.

In some implementations, the process of determining the surface structure information can be as follows: The mobile terminal uses multiple groups of infrared emitters to emit multiple infrared rays to the photographing area of the article, and records an emitting time and an emitting speed of each infrared ray. Then, the mobile terminal uses multiple groups of receiving sensors to receive multiple infrared rays that are returned by the article after receiving the multiple infrared rays, and records a receiving time of each returned infrared ray. Finally, multiple different distances between the mobile terminal and the damaged part can be determined based on the recorded multiple emitting times, multiple emitting speeds, and multiple receiving times. Based on the multiple different distances, a three-dimensional structure of the damaged part can be obtained, i.e., the surface structure information of the damaged part of the article can be determined.

After determining the surface structure information, the mobile terminal can determine a surface undulation diagram of the damaged part. It can be understood that, whether there is deformation on the surface of the damaged part can be determined based on the determined surface undulation diagram.

Figure 3:
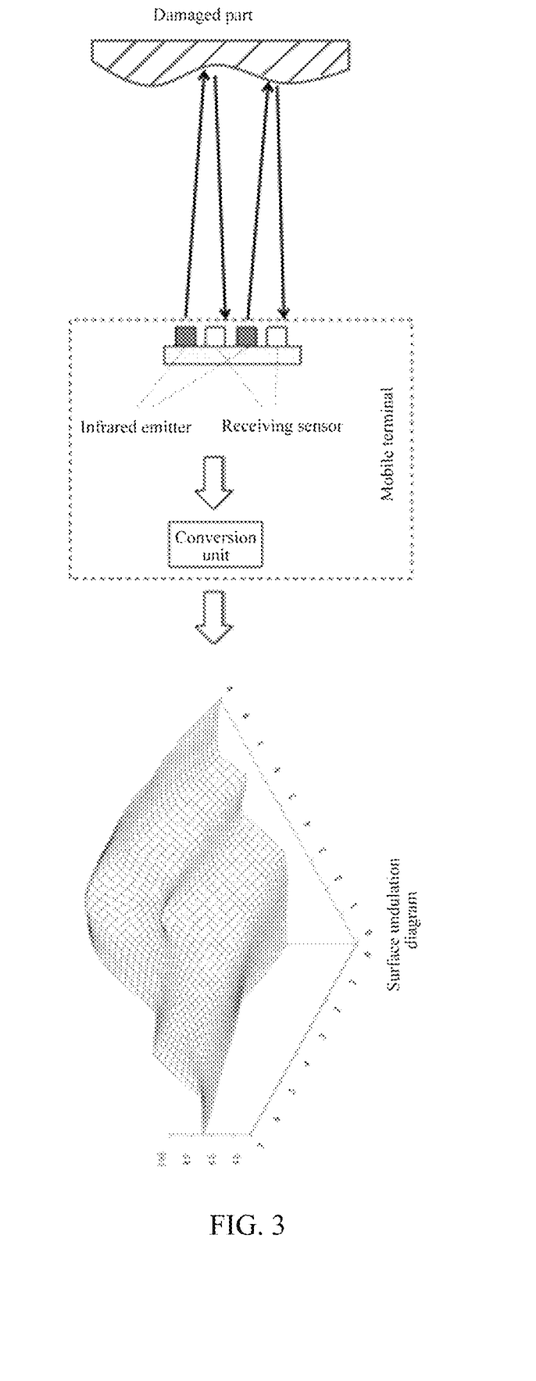
FIG. 3 is a schematic diagram illustrating a process of determining a surface undulation diagram, according to the present specification.

For example, the process of determining the surface undulation diagram can be shown in FIG. 3. In FIG. 3, the mobile terminal can further include a conversion unit. The conversion unit is configured to convert the received infrared signal into a digital signal so that the computer can process the signal. As can be seen from FIG. 3, the finally determined surface undulation diagram can be three-dimensional, thus facilitating the determining of the damage degree of the damaged part.

Certainly, in practice, when the mobile terminal further includes a depth of field camera or a binocular camera, the surface structure information can be further corrected with reference to an image acquired by the depth of field camera or the binocular camera. Thus, accuracy of determining the damage degree of the damaged part can be improved.

The process of determining the surface structure information is described previously. The process of determining the surface material information can be as follows: The mobile terminal uses multiple groups of infrared emitters to emit multiple infrared rays to the photographing area of the article. Then, the mobile terminal uses multiple groups of receiving sensors to receive multiple infrared rays that are returned by the article after receiving the multiple infrared rays, and records a receiving temperature of each returned infrared ray. Finally, the surface material information of the damaged part can be determined based on the recorded multiple receiving temperatures. The principle of the determination process is that the temperatures of the infrared rays returned by different materials are different.

After determining the surface material information, the mobile terminal can determine a surface material diagram of the damaged part. It can be understood that, it can be determined, based on the determined surface material diagram, whether there is paint peeling, dust coverage, metal layer exposure, etc. on the damaged part.

Figure 4:
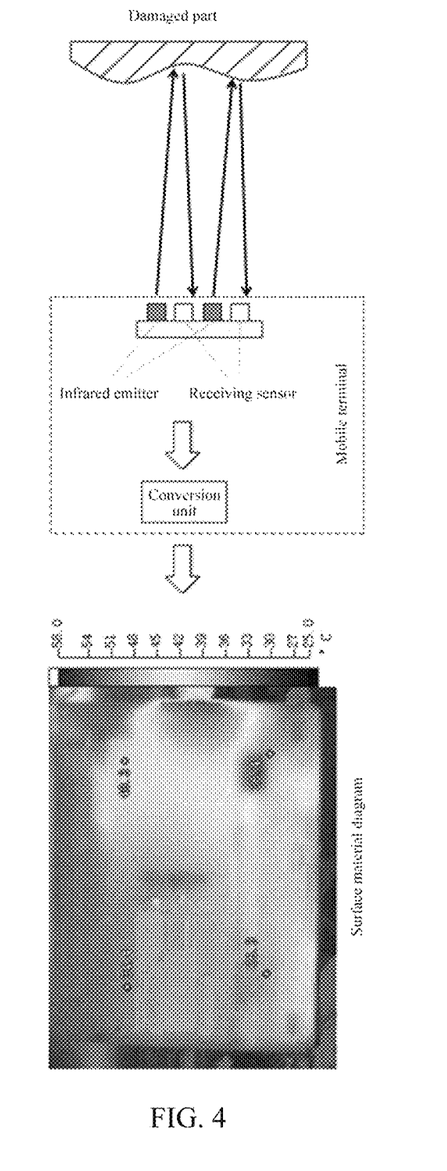
FIG. 4 is a schematic diagram illustrating a process of determining a surface material diagram, according to the present specification.

For example, the process of determining the surface material diagram can be shown in FIG. 4. In FIG. 4, the mobile terminal can further include a conversion unit (same as previous description).

It can be understood that, the process of determining the surface structure information and the process of determining the surface material information can be performed separately or simultaneously, which is not limited in the present specification.

Step S240: Input the photographed image, the surface structure information, and the surface material information into a predetermined damage evaluation model.

Step S250: Output the damage degree of the damaged part of the article.

The damage evaluation model here can be obtained based on photographed images, surface structure information, surface material information, and deep learning training algorithms of damaged parts of multiple sample articles. Multiple sample articles can be collected in advance, and are labeled with sample labels (e.g., minor damage, moderate damage, severe damage, etc.). Then, the damaged part of the sample article is photographed, and the surface structure information and the surface material information of the damaged part are obtained (the obtaining process is the same as previous description). Finally, a deep neural network is trained based on the sample labels of the sample articles, the photographed images, the surface structure information, and the surface material information of the damaged parts, to obtain a trained damage evaluation model. Model training based on sample data belongs to the conventional technology, and is omitted here for simplicity.

It is worthwhile to note that, when the deep neural network is a convolutional neural network, the damage evaluation model obtained through training can include one or more convolutional layers, one or more pooling layers, and one or more fully connected layers.

Figure 5:
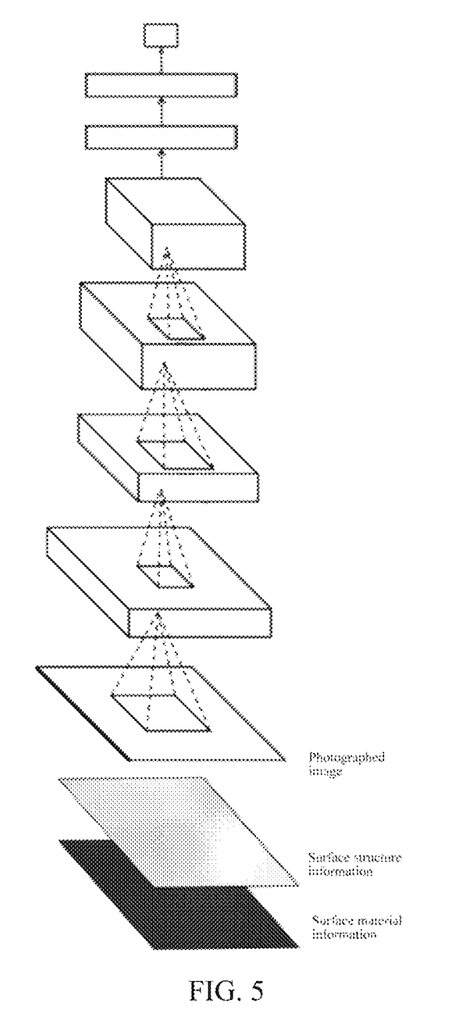
FIG. 5 is a schematic diagram illustrating an article damage evaluation process, according to the present specification.

For example, the photographed image, the surface structure information, and the surface material information are input into the damage evaluation model obtained through training based on the convolutional neural network, to identify the damage degree of the damaged part, as shown in FIG. 5.

For example, the damage degree that's finally output in the present implementation can be minor damage (including slight deformation, paint peeling, etc.), moderate damage, severe damage, etc. Certainly, in practice, the damage degree can also be other information used to indicate the damage degree, which is not limited in the present specification.

In conclusion, the solutions provided in the implementations of the present specification have the following advantages:

(1) The accuracy of identifying deformation can be improved with reference to the surface structure information and the photographed image of the damaged part of the article.

(2) Visual interfering factors such as light reflection, inverted image, dust stain, etc. can be corrected by using the surface material information and the surface structure information of the damaged part, so as to prevent the deep neural network from misidentifying the visual interfering factors as damage.

(3) The damage degree is determined more accurately, particularly for the damage such as slight deformation or paint peeling, so as to increase the accuracy to an extent that cannot be achieved by using visual information only.

In a word, in the present solution, when damage evaluation is performed on the damaged part of the article, both the image of the damaged part and the surface structure information and surface material information of the damaged part are considered, thus providing more complete damage evaluation capability. In addition, in the present solution, the mobile terminal automatically performs damage evaluation on the damaged part, thus significantly reducing experience needs of damage evaluation, providing a fair and objective evaluation result, increasing difficulty of cheating and falsification, and enabling the user to personally provide an accurate and reliable evaluation result so that costs for on-site manual inspection of the insurance company are reduced.

Figure 6:
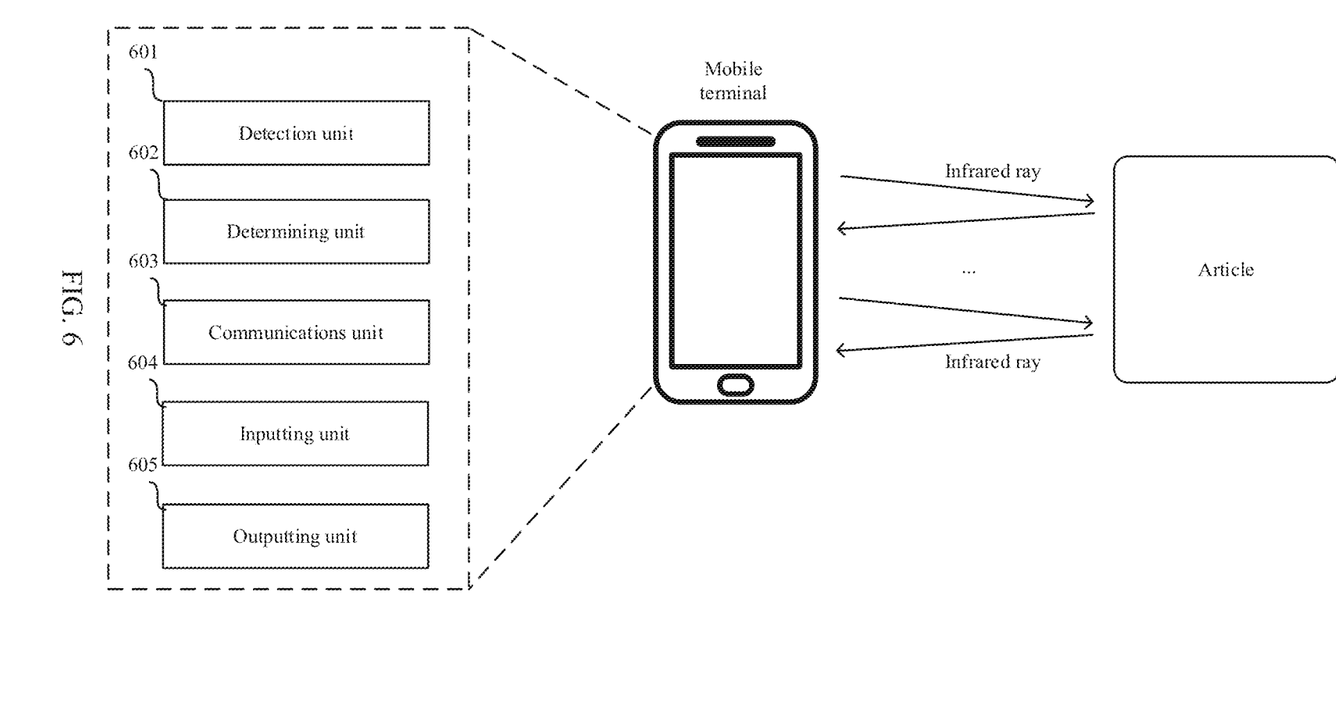
FIG. 6 is a schematic diagram illustrating an article damage evaluation apparatus, according to an implementation of the present specification.

Corresponding to the previously described article damage evaluation method, an implementation of the present specification further provides an article damage evaluation apparatus. As shown in FIG. 6, the apparatus includes the following: a detection unit 601, configured to detect whether a photographing device is in a photographing state; a determining unit 602, configured to: when the detection unit 601 detects that the photographing device is in the photographing state, determine a photographing area of the photographing device for an article, where the photographing area covers a damaged part of the article, and acquire a photographed image corresponding to the photographing area; a communications unit 603, configured to emit multiple infrared rays to the photographing area, determined by the determining unit 602, of the article, so as to determine surface structure information and surface material information of the damaged part of the article, where the communications unit 603 can include multiple groups of infrared emitters and multiple groups of receiving sensors corresponding to the multiple groups of infrared emitters; an inputting unit 604, configured to input the photographed image, the surface structure information, and the surface material information into a predetermined damage evaluation model; and an outputting unit 605, configured to output a damage degree of the damaged part of the article.

Optionally, the communications unit 603 can be configured to: emit multiple infrared rays to the photographing area of the article, and record an emitting time and an emitting speed; receive multiple infrared rays returned by the article after receiving the multiple infrared rays, and record a receiving time and a receiving temperature; determine the surface structure information of the damaged part of the article, based on the emitting time, the emitting speed, and the receiving time; and determine the surface material information of the damaged part of the article, based on the receiving temperature.

Optionally, the apparatus can further include the following: an acquisition unit 606, configured to acquire a target image of the article, by using a depth of field camera or a binocular camera; and a correction unit 607, configured to correct the surface structure information based on the target image acquired by the acquisition unit 606, to obtain the corrected surface structure information.

The inputting unit 604 can be configured to: input the photographed image, the corrected surface structure information, and the surface material information into the predetermined damage evaluation model.

The damage evaluation model can be obtained based on photographed images, surface structure information, surface material information, and deep neural networks of damaged parts of multiple sample articles.

The functions of the functional modules of the apparatus in the previous implementation of the present specification can be implemented by using the steps of the previous method implementation. Therefore, a specific working process of the apparatus provided in an implementation of the present specification is omitted here for simplicity.

In an article damage evaluation apparatus provided in an implementation of the present specification, a detection unit 601 detects whether a photographing device is in a photographing state. When detecting that the photographing device is in the photographing state, a determining unit 602 determines a photographing area of the photographing device for an article, and acquires a photographed image corresponding to the photographing area. A communications unit 603 emits multiple infrared rays to the photographing area of the article, so as to determine surface structure information and surface material information of the damaged part of the article. An inputting unit 604 inputs the photographed image, the surface structure information, and the surface material information into a predetermined damage evaluation model. An outputting unit 605 outputs a damage degree of the damaged part of the article. As such, the damage degree of the article can be automatically evaluated.

The article damage evaluation apparatus provided in the implementations of the present specification can be a module or unit of the mobile terminal in FIG. 1.

A person skilled in the art should be aware that in the previously described one or more examples, functions described in the present specification can be implemented by hardware, software, firmware, or any combination thereof. When being implemented by using software, these functions can be stored in a computer-readable medium or transmitted as one or more instructions or code in the computer-readable medium.

The objectives, technical solutions, and beneficial effects of the present specification are further described in detail in the previously described specific implementations. It should be understood that the previous descriptions are merely specific implementations of the present specification, but are not intended to limit the protection scope of the present specification. Any modification, equivalent replacement, or improvement made based on the technical solutions of the present specification shall fall within the protection scope of the present specification.

What is claimed is:

1. A method for evaluating damage to an article, comprising:
    determining, by a terminal device, that a photographing device is in an active state;
    responsive to determining that the photographing device is in the active state, identifying, from a field of view of the photographing device, a particular surface region of the article that encompasses the damage to the article;
    obtaining an image of the particular surface region using the photographing device;
    determining surface structure information and surface material information of the particular surface region of the article using one or more infrared emitters and one or more infrared receivers, wherein determining the surface structure information and the surface material information of the particular surface region comprises:
        emitting, using the one or more infrared emitters, infrared rays to the surface region of the article;
        recording an emitting time;
        receiving, using the one or more infrared receivers, a portion of the infrared rays reflected from the particular surface region;
        recording a receiving time and a receiving temperature corresponding to the portion of the infrared rays reflected by the particular surface region;
        determining, based on the emitting time and the receiving time, the surface structure information of the particular surface region of the article; and
        determining, based on the receiving temperature, the surface material information of the particular surface region of the article; and
    generating, from the image, the surface structure information, and the surface material information, and based on a predetermined damage evaluation model, an output specifying a degree of the damage to the article.

2. The method according to claim 1, further comprising:
    obtaining a target image of the article by using a depth of field camera or a binocular camera; and
    determining a correction to the surface structure information based on the target image to obtain corrected surface structure information.

3. The method according to claim 2, further comprising:
    providing the target image, the corrected surface structure information, and the surface material information as input to the predetermined damage evaluation model.

4. The method according to claim 1, wherein:
    the terminal device emits the infrared rays by using multiple sets of infrared emitters; and
    the terminal device receives the reflected infrared rays by using multiple sets of infrared receivers corresponding to the multiple sets of infrared emitters.

5. The method according to claim 1, wherein the damage evaluation model is a deep neural network trained on a plurality of training samples each comprising an image, surface structure information, and surface material information of a damaged article.

6. A non-transitory, computer-readable medium storing one or more instructions executable by a computer system to perform operations for evaluating damage to an article, wherein the operations comprise:
    determining, by a terminal device, that a photographing device is in an active state;
    responsive to determining that the photographing device is in the active state, identifying, from a field of view of the photographing device, a particular surface region of the article that encompasses the damage to the article;
    obtaining an image of the particular surface region using the photographing device;
    determining surface structure information and surface material information of the particular surface region of the article using one or more infrared emitters and one or more infrared receivers, wherein determining the surface structure information and the surface material information of the particular surface region comprises:
        emitting, using the one or more infrared emitters, infrared rays to the surface region of the article;
        recording an emitting time;
        receiving, using the one or more infrared receivers, a portion of the infrared rays reflected from the particular surface region;
        recording a receiving time and a receiving temperature corresponding to the portion of the infrared rays reflected by the particular surface region;
        determining, based on the emitting time and the receiving time, the surface structure information of the particular surface region of the article; and
        determining, based on the receiving temperature, the surface material information of the particular surface region of the article; and
    generating, from the image, the surface structure information, and the surface material information, and based on a predetermined damage evaluation model, an output specifying a degree of the damage to the article.

7. The non-transitory, computer-readable medium of claim 6, wherein the operations further comprise:
    obtaining a target image of the article by using a depth of field camera or a binocular camera; and
    determining a correction to the surface structure information based on the target image to obtain corrected surface structure information.

8. The non-transitory, computer-readable medium of claim 7, wherein the operations further comprise:
    providing the target image, the corrected surface structure information, and the surface material information as input to the predetermined damage evaluation model.

9. The non-transitory, computer-readable medium of claim 6, wherein:
    the terminal device emits the infrared rays by using multiple sets of infrared emitters; and
    the terminal device receives the reflected infrared rays by using multiple sets of infrared receivers corresponding to the multiple sets of infrared emitters.

10. The non-transitory, computer-readable medium of claim 6, wherein the damage evaluation model is a deep neural network trained on a plurality of training samples each comprising an image, surface structure information, and surface material information of a damaged article.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for evaluating damage to an article, wherein the operations comprise:
determining, by a terminal device, that a photographing device is in an active state;
responsive to determining that the photographing device is in the active state, identifying, from a field of view of the photographing device, a particular surface region of the article that encompasses the damage to the article;
obtaining an image of the particular surface region using the photographing device;
determining surface structure information and surface material information of the particular surface region of the article using one or more infrared emitters and one or more infrared receivers, wherein determining the surface structure information and the surface material information of the particular surface region comprises:
emitting, using the one or more infrared emitters, infrared rays to the surface region of the article;
recording an emitting time;
receiving, using the one or more infrared receivers, a portion of the infrared rays reflected from the particular surface region;
recording a receiving time and a receiving temperature corresponding to the portion of the infrared rays reflected by the particular surface region;
determining, based on the emitting time and the receiving time, the surface structure information of the particular surface region of the article; and
determining, based on the receiving temperature, the surface material information of the particular surface region of the article; and
generating, from the image, the surface structure information, and the surface material information, and based on a predetermined damage evaluation model, an output specifying a degree of the damage to the article.

12. The computer-implemented system of claim 11, wherein the operations further comprise:
obtaining a target image of the article by using a depth of field camera or a binocular camera; and
determining a correction to the surface structure information based on the target image to obtain corrected surface structure information.

13. The computer-implemented system of claim 12, wherein the operations further comprise:
providing the target image, the corrected surface structure information, and the surface material information as input to the predetermined damage evaluation model.

14. The computer-implemented system of claim 2, wherein:
the terminal device emits the infrared rays by using multiple sets of infrared emitters; and
the terminal device receives the reflected infrared rays by using multiple sets of infrared receivers corresponding to the multiple sets of infrared emitters.

15. The computer-implemented system of claim 11, wherein the damage evaluation model is a deep neural network trained on a plurality of training samples each comprising an image, surface structure information, and surface material information of a damaged article.

* * * * *

UNITED STATES PATENT AND TRADEMARK OFFICE
CERTIFICATE OF CORRECTION

PATENT NO. : 11,300,522 B2
APPLICATION NO. : 16/888598
DATED : April 12, 2022
INVENTOR(S) : Fan Zhou It is certified that error appears in the above-identified patent and that said Letters Patent is hereby corrected as shown below:

On the Title Page

Column 2 (Other Publications), Line 3, delete "D0I:" and insert -- DOI: --.

In the Claims

Column 10, Line 23 (approx.), delete "claim 2," and insert -- claim 11, --.

Signed and Sealed this
Sixteenth Day of August, 2022

Katherine Kelly Vidal
*Director of the United States Patent and Trademark Office*